Dec. 28, 1965  J. R. DISON  3,225,876
AIRCRAFT SAFETY COUPLING

Filed May 13, 1964  2 Sheets-Sheet 1

INVENTOR.
JAMES R. DISON

BY

*W. E. Finken*

HIS ATTORNEY

Dec. 28, 1965 J. R. DISON 3,225,876
AIRCRAFT SAFETY COUPLING
Filed May 13, 1964 2 Sheets-Sheet 2

INVENTOR.
JAMES R. DISON
BY
W. E. Finch
HIS ATTORNEY

United States Patent Office 3,225,876
Patented Dec. 28, 1965

3,225,876
AIRCRAFT SAFETY COUPLING
James R. Dison, Indianapolis, Ind., assignor to General Motors Corporation, Detroit, Mich., a corporation of Delaware
Filed May 13, 1964, Ser. No. 367,090
8 Claims. (Cl. 192—46)

This invention pertains to aircraft power plants, and more particularly to an improved safety coupling between an aircraft engine and a propeller for automatically decoupling the engine from the propeller in the event of an engine failure.

It is well recognized that in multi-power plant aircraft it is essential to declutch, or decouple, a failed engine from its propeller so as to minimize the power loss and drag caused by the propeller driving a failed engine. This is particularly true in aircraft powered by gas turbine engines. One type of safety coupling for accomplishing this purpose is disclosed in McDowall et al. Patent 2,893,495.

The present invention relates to an improved safety coupling which will decouple the engine from the propeller at a predetermined negative torque, negative torque being defined as power transmitted to the engine from the propeller. In addition, the improved safety coupling, upon decoupling, will maintain the engine and the propeller decoupled until the speeds thereof approach equalization minimizing ratcheting between the coupling parts.

Accordingly, among my objects are the provision of an improved safety coupling including means for preventing ratcheting of the coupling parts when decoupled at relatively high r.p.m.; the further provision of a safety coupling including means responsive to a predetermined negative torque for automatically decoupling the engine from the propeller; and the still further provision of a safety coupling including splined members of opposite hands but of equal leads so as to eliminate inertia forces and minimize variations in the operation thereof provided by variation of the friction coefficient between the mating splines.

The aforementioned and other objects are accomplished in the present invention by embodying spring loaded double helical splines to permit decoupling at pre-set negative torque values and for developing opposing loads of equal magnitude when the component parts of the coupling are rotated at the same speed, whereas the loading becomes unbalanced after decoupling due to a speed differential between the parts of the coupling thereby causing an axial force unbalance which maintains the coupling parts separated, thus preventing ratcheting.

Further objects and advantages of the present invention will be apparent from the following description, reference being had to the accompanying drawings, wherein a preferred embodiment of the present invention is clearly shown and wherein similar numerals depict similar parts throughout the several views.

Figure 1:
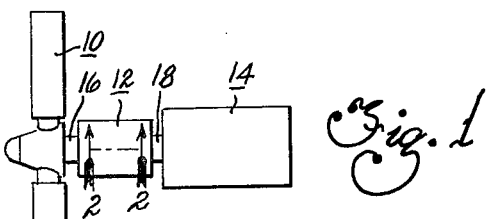
FIGURE 1 is a schematic representation of an aircraft power plant embodying the safety coupling of the present invention.

Referring to FIGURE 1, an aircraft power plant is illustrated comprising a variable pitch propeller 10 connected through a reduction gear unit and safety coupling disposed in a housing 12 to a gas turbine engine 14. The propeller 10 includes a hub shaft 16 which extends into the transmission housing 12, and the gas turbine engine 14 includes an extension shaft 18 which extends into the opposite end of the transmission housing 12. It is to be understood that the transmission housing 12 is substantially filled with hydraulic fluid, which hydraulic fluid is utilized to lubricate the component parts of the safety coupling and gear reduction unit as well as to perform the other functions hereinafter described.

Figure 2:
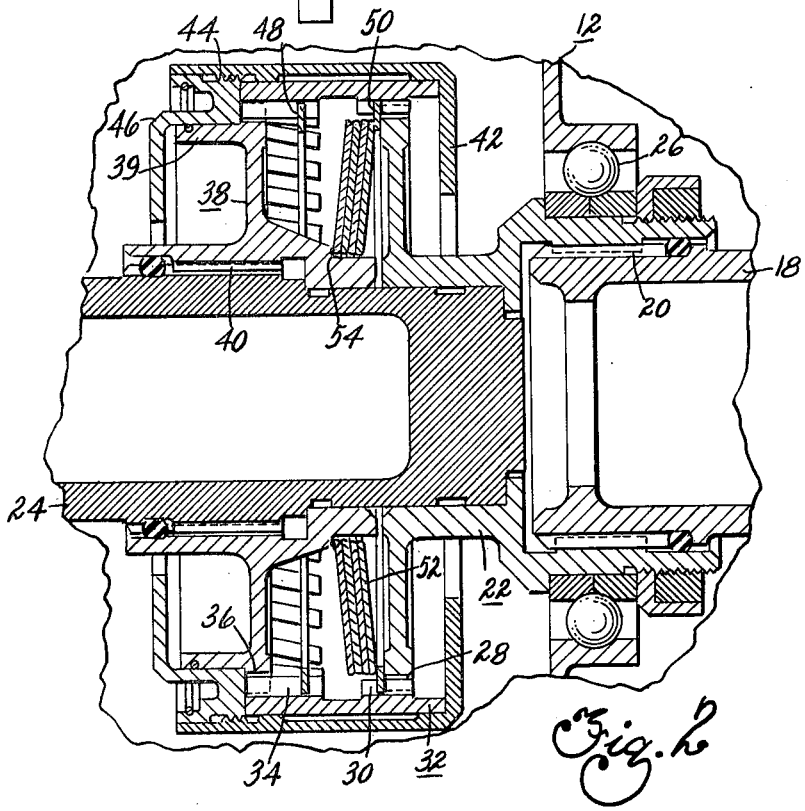
FIGURE 2 is an enlarged fragmentary sectional view depicting the improved safety coupling in the engaged position.
Figure 3:
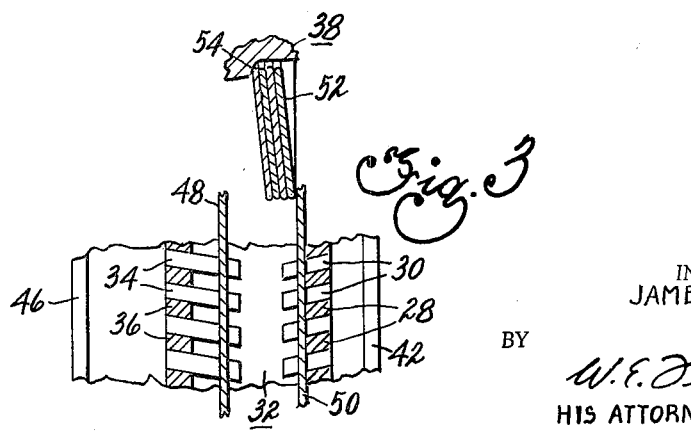
FIGURE 3 is an enlarged fragmentary sectional view depicting component parts of the improved safety coupling in the engaged position.

Referring to FIGURES 2 and 3, the engine power shaft, or extension shaft, 18 has a straight splined connection at 20 with a flanged coupling disc 22. The flanged coupling disc 22 is piloted on a gear reduction input shaft 24 and is supported for rotation relative to the transmission housing 12 by a ball bearing assembly 26. The coupling disc 22 is formed with a set of external helical spline teeth 28 which extend entirely around its outer periphery and mate with a set of internal helical spline teeth 30 formed on an annular coupling member 32. The annular coupling member 32 is formed with a second set of internal helical spline teeth 34 axially spaced from the helical spline teeth 30. The helical spline teeth 30 and 34 are of opposite hands but of the same lead. Moreover, while in the illustrative embodiment the two sets of helical spline teeth 30 and 34 are depicted as being of the same diameter this is only exemplary since the improved safety coupling can be constructed with internal helical spline teeth of different diameters. However, it is essential that the two sets of internal helical spline teeth have the same lead. As disclosed, the helical spline teeth 30 are right-hand, whereas the helical spline teeth 34 are left-hand.

The internal helical spline teeth 34 mate with a set of external helical spline teeth 36 on a second coupling disc 38 having a straight splined connection at 40 with gear reduction input shaft 24. The coupling disc 38 has an outer flange 39, the purpose of which will be described hereinafter. The coupling annulus 32 is restrained against axial movement by its confinement between a cup-shaped member 42 which is threadedly connected at 44 with a cup-shaped member 46. This entire assembly comprising the members 42 and 46 together with the annulus 32 is slidably supported for axial movement on the flange 39 of the coupling disc 38. A snap ring 48 is interlocked with the internal helical spline teeth 34 for limiting movement of the coupling assembly to the left as seen in FIGURE 2. A similar snap ring 50 is interlocked with the internal helical spline teeth 30. A stack of Belleville spring washers 52 is interposed between the snap ring 50 and a shoulder 54 on the coupling disc 38, the Belleville spring washer stack 52 biasing the snap ring 50 and hence the coupling annulus 32 as well as the cup-shaped members 42 and 46 to the right as seen in FIGURE 2 and maintaining the snap ring 50 in engagement with the coupling disc 22.

During normal operation, that is when the engine 14 is transmitting power to the propeller 10, the safety coupling will be engaged. Under these conditions the coupling disc 22 will have its helical spline teeth 28 fully engaged with the helical spline teeth 30 on the coupling annulus 32 so that power from the engine driven shaft 18 will be transmitted through the coupling disc 22, helical spline teeth 28 and 30 to the coupling annulus 32 and from the annulus 32 through the helical spline teeth 34 and 36 to the coupling disc 38 and thence to the input shaft 24.

As alluded to hereinbefore, the transmission housing 12 is substantially filled with hydraulic fluid, and the members 38 and 46 constitute one cup while the members 42 and 22 constitute a second cup. The helical spline axial load components and the Belleville spring washer stack 52 hold the coupling members engaged and the opposing hydraulic centrifugal axial forces created by rotation of the cups 38, 46 and 42, 22 at the same speed are exactly balanced.

Figure 4:
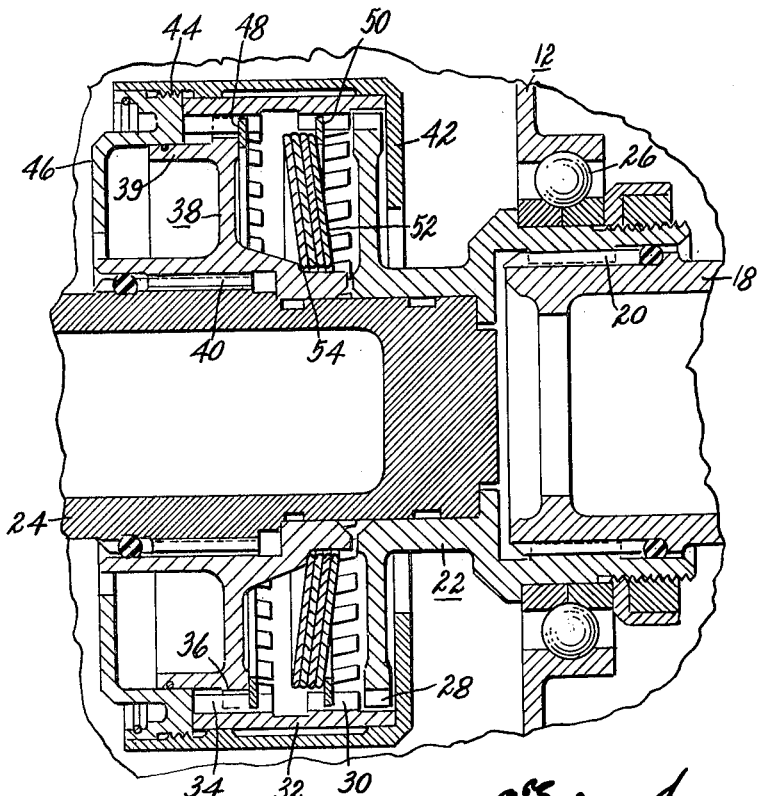
FIGURE 4 is a view similar to FIGURE 2 depicting the safety coupling in the disengaged position.
Figure 5:
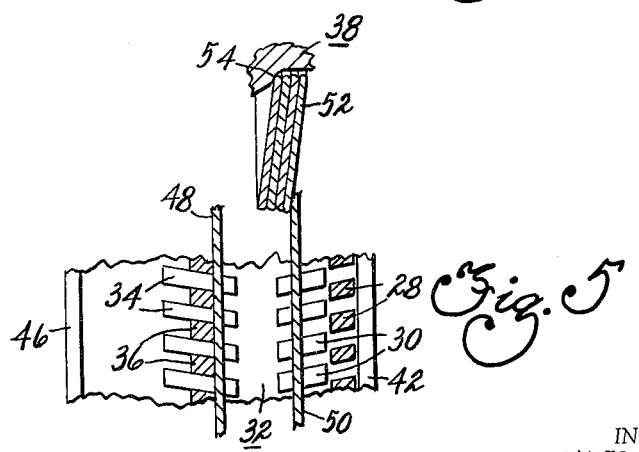
FIGURE 5 is a view similar to FIGURE 3 showing component parts of the coupling in the disengaged position.

However, upon an engine failure thereby causing negative torque greater than a predetermined magnitude, i.e. 450 to 600 foot pounds, to be transmitted from the propeller to the engine, members 32, 42 and 46 are forced to the left along helical splines 28 and 36 against preset springs 52, the assembly moves from the position of FIGURE 2 to the position of FIGURE 4, decoupling is accomplished, and cup comprising members 38 and 46 rotate at input shaft speed which is equivalent to propeller speed as does the cup part 42, whereas the cup part 22 rotates at engine speed. Belleville spring loading in this decoupling position has reduced to 10% of the pre-set loading at the coupled position. This speed differential between member 42 and the member 22 unbalances the centrifugal hydraulic axial loading overcoming the thrust of Belleville washer stack 52, and causing the coupling annulus 32 and the cup members 42 and 46 to move further to the left relative to the coupling disc 22. Upon movement of this assembly further to the left from the decoupled position, it can be seen that the coupling disc 22 is removed from conact with the helical spline teeth 30 on the coupling annulus 32 and ratcheting cannot occur.

When the speed of the propeller and the engine are again equalized, the differential axial centrifugal hydraulic force no longer exists, and accordingly, the Belleville spring washer stack 52 will re-engage the coupling and move the cup-shaped members 42 and 46 and the coupling annulus 32 from the position of FIGURE 4 to the position of FIGURE 2. By utilizing a double helical spline arrangement in the coupling annulus 32, variations in the decoupling torque required to actuate the safety coupling are minimized.

While the embodiment of the present invention as herein disclosed constitutes a preferred form, it is to be understood that other forms might be adopted.

What is claimed is as follows:

1. A safety coupling for an aircraft power plant having an engine and a propeller including, an engine driven shaft, an intermediate shaft operatively connected to said propeller, a housing into which both of said shafts extend, said housing being partially filled with hydraulic fluid, a first coupling disc connected to rotate with said engine driven shaft, a second coupling disc connected to rotate with said intermediate shaft, said first and second coupling discs having external helical spline teeth of the same lead but opposite hands, a coupling annulus having spaced sets of internal helical spline teeth of the same lead but opposite hands mating respectively with the external helical spline teeth of said coupling discs, resilient means reacting against said coupling annulus for maintaining said coupling discs engaged with said coupling annulus to transmit power from said engine driven shaft to said intermediate shaft, said helical spline teeth interacting to overcome said resilient means and disengage said first coupling disc from said coupling annulus in response to a predetermined torque transmitted from said intermediate shaft to said engine driven shaft, and centrifugally actuated hydraulic means reacting against said coupling annulus for maintaining said first coupling disc in an anti-ratcheting position.

2. A safety coupling for an aircraft power plant having an engine and a propeller including, an engine driven shaft, an intermediate shaft operatively connected to said propeller, a transmission housing partially filled with hydraulic fluid, a first coupling member disposed within said housing and connected to rotate with said engine driven shaft, a second coupling member disposed within said housing and connected to rotate with said intermediate shaft, said first and second coupling members having external helical spline teeth of the same lead but of opposite hands, a coupling annulus disposed within said transmission housing having spaced sets of internal helical spline teeth of the same lead but opposite hands, one set of helical spline teeth on said coupling annulus having continuous engagement with said second coupling member, resilient means biasing said coupling annulus so as to maintain said first coupling member in driving engagement with said coupling annulus during the transmission of said torque from said engine driven shaft to said intermediate shaft, said helical spline teeth interacting to overcome said resilient means and disengage said first coupling member from said coupling annulus in response to a predetermined transmission of torque from said intermediate shaft to said engine driven shaft, and means slidably supported on said second coupling member and carrying said coupling annulus for developing axial centrifugal hydraulic forces for maintaining said first coupling member in an anti-ratcheting position.

3. A safety coupling for an aircraft power plant having an engine and a propeller including, an engine driven shaft, an intermediate shaft, a transmission housing partially filled with hydraulic fluid, a first coupling member disposed within said transmission housing and drivingly connected to rotate with said engine driven shaft, a second coupling member disposed within said transmission housing and connected to rotate with said intermediate shaft, said first and second coupling members having helical spline teeth of the same lead but opposite hands, a coupling annulus having spaced sets of helical spline teeth of the same lead but opposite hands, the spaced sets of helical spline teeth on said coupling annulus being engageable with the helical spline teeth on said first and second coupling members, resilient means reacting against said coupling annulus for maintaining said coupling annulus engaged with said first and second coupling members to transmit torque from said engine driven shaft to said intermediate shaft, and means including the interaction between said helical spline teeth to overcome said resilient means for decoupling said first coupling member from said coupling annulus upon a predetermined transmission of torque from said intermediate shaft to said engine driven shaft.

4. The safety coupling set forth in claim 3 wherein the helical spline teeth on said coupling annulus are internal and wherein the helical spline teeth on said coupling members are external, and wherein said resilient means comprises a Belleville spring washer stack reacting between said second coupling member and said coupling annulus.

5. The safety coupling set forth in claim 3 wherein said second coupling member includes a flanged outer edge, and wherein said coupling annulus is confined between a pair of cup-shaped members, one of which is slidably supported on the flanged edge of said second coupling member.

6. The combination set forth in claim 5 wherein the helical spline teeth on said annulus are internal and of the same diameter, wherein the helical spline teeth on said coupling members are external and of the same diameter, a snap ring seated in each set of internal helical spline teeth on said coupling annulus, and wherein said resilient means comprises a Belleville spring washer stack reacting between said second coupling member and one of said snap rings on said coupling annulus.

7. A safety coupling for an aircraft power plant having an engine and a propeller including, an engine driven shaft, an intermediate shaft operatively connected to said propeller, a housing into which both of said shafts extend, said housing being partially filled with hydraulic fluid, a first coupling disc connected to rotate with said engine driven shaft, a second coupling disc connected to rotate with said intermediate shaft, said first and second coupling discs having an external helical spline teeth of the same lead but opposite hands, a coupling annulus having spaced sets of internal helical spline teeth of the same lead but opposite hands mating respectively with the external helical spline teeth of said coupling discs, resilient means reacting against said coupling annulus and responsive to negative torque between said shafts for permitting disengagement upon a predetermined negative torque, and centrifugally actuated hydraulic means reacting against said coupling annulus for maintaining said first coupling disc in an anti-ratcheting position after decoupling.

8. A safety coupling for an aircraft power plant having an engine and propeller including, an engine driven shaft, an intermediate shaft, a transmission housing partially filled with hydraulic fluid, a first coupling member disposed within said transmission housing and drivingly connected to rotate with said engine driven shaft, a second coupling member disposed within said transmission housing and connected to rotate with said intermediate shaft, said first and second coupling members having helical spline teeth of the same lead but opposite hands, a coupling annulus having spaced sets of helical spline teeth of the same lead but opposite hands, the spaced sets of helical spline teeth on said coupling annulus being engageable with the helical spline teeth on said first and second coupling members, resilient means reacting against said coupling annulus and responsive to negative torque between said shafts for permitting disengagement upon a predetermined negative torque, and hydraulic centrifugally actuated means reacting against said coupling annulus for maintaining said first coupling member disengaged from said coupling annulus after decoupling.

References Cited by the Examiner

UNITED STATES PATENTS

| 2,051,975 | 9/1936 | Wemp | 192—46 X |
| 2,337,571 | 12/1943 | Pullin | 170—135.75 X |
| 2,676,496 | 4/1954 | Gilbert | 192—46 |

FOREIGN PATENTS

| 858,460 | 1/1961 | Great Britain. |
| 895,031 | 9/1960 | Great Britain. |

DON A. WAITE, *Primary Examiner.*

BENJAMIN W. WYCHE III, *Assistant Examiner.*